United States Patent [19]

Yoshioka

[11] Patent Number: 5,333,455

[45] Date of Patent: Aug. 2, 1994

[54] DISPLACEMENT MAGNIFIER FOR PIEZOELECTRIC ELEMENT

[75] Inventor: Shigeki Yoshioka, Yokohama, Japan

[73] Assignee: Nissan Motor Co., Ltd., Yokohama, Japan

[21] Appl. No.: 948,489

[22] Filed: Sep. 22, 1992

[30] Foreign Application Priority Data

Sep. 26, 1991 [JP] Japan .................................. 3-247533

[51] Int. Cl.$^5$ .......................... F15B 7/00; F16F 15/03
[52] U.S. Cl. ..................................... 60/533; 188/267; 267/140.14
[58] Field of Search ................. 92/5 R; 91/1, DIG. 4; 60/533; 267/140.14, 140.15; 188/267

[56] References Cited

U.S. PATENT DOCUMENTS

| | | | |
|---|---|---|---|
| 4,583,723 | 4/1986 | Ozawa | 188/267 X |
| 4,669,711 | 6/1987 | Beer | 188/267 X |
| 4,789,142 | 12/1988 | Hoying et al. | 267/140.15 X |
| 4,793,599 | 12/1988 | Ishioka | 188/267 X |
| 4,802,648 | 2/1989 | Decker et al. | 267/140.15 X |
| 5,100,166 | 3/1992 | Mitsui | 188/267 X |

FOREIGN PATENT DOCUMENTS

| | | |
|---|---|---|
| 59-23140 | 2/1984 | Japan . |
| 0057032 | 4/1985 | Japan ................... 188/267 |
| 0013930 | 1/1988 | Japan ................... 188/267 |
| 59-23139 | 2/1989 | Japan . |
| 1-114522 | 5/1989 | Japan . |

*Primary Examiner*—Edward K. Look
*Assistant Examiner*—Hoang Nguyen
*Attorney, Agent, or Firm*—Foley & Lardner

[57] ABSTRACT

A displacement magnifying device for magnifying the displacement of a piezoelectric element according to an applied voltage, is applied to a vibration absorber and an actuator. The device includes a member for supporting the element, a first elastic sealing member forming part of a sealed chamber containing a non-compressible fluid which moves together with the other end of the element, a second elastic sealing member also forming part of the chamber, and a displacement transmitting member connected to the second sealing member. Preferably, the first sealing member is a diaphragm and the second sealing member is a bellows. By setting the volume change of the chamber per unit displacement of the first sealing member to be larger than the volume change of the chamber per unit displacement of the second sealing member, the displacement of the piezoelectric element is magnified and transmitted to the displacement transmitting member.

6 Claims, 7 Drawing Sheets

DISPLACEMENT MAGNIFIER FOR PIEZOELECTRIC ELEMENT

FIELD OF THE INVENTION

This invention relates to a device which magnifies the displacement of a piezoelectric element for use in vibration absorbers and actuators.

BACKGROUND OF THE INVENTION

A mounting device for supporting a car engine in a chassis in such a way as to prevent vibration, comprising a piezoelectric element which deforms according to an applied voltage, has been disclosed in Tokkai Sho 59-23139, Tokkai Sho 59-23140 and Tokkai Hei 1-114522 published by the Japanese Patent Office.

In these mounting devices, piezoelectric elements and rubber vibration absorbers are arranged in series between flanges, and fixed between the engine and the chassis by means of bolts.

The piezoelectric element elongates in an axial direction when a voltage is applied to it. By causing the element to elongate and contract in synchronism with the frequency of a vibration so as to oppose the displacement of the engine which would be produced by the vibration, therefore, the vibration of the engine can be prevented.

However, these mounting devices consist of active damping means, i.e. the piezoelectric element, and passive damping means, i.e. the rubber vibration absorbers, arranged in series. Part of the damping effect of the active damping means is therefore absorbed by the rubber vibration absorbers, and the overall damping effect has consequently been impaired by a corresponding amount.

Displacements of the engine, which are the cause of engine noise or acceleration noise, are generally of the order of 100 μm. If a piezoelectric element having a distortion of 0.1% or less is used to prevent this vibration, the length of the element should be at least 10 cm. The size of the device therefore reaches unsuitably large proportions for mounting in automobile engines.

SUMMARY OF THE INVENTION

It is therefore an object of the invention to provide a magnifier for magnifying the displacement of a piezoelectric element.

It is a further object of the invention to render the assembly of the aforesaid displacement magnifier easier.

It is a further object of the invention to prevent excessive loads from acting on the piezoelectric element in the aforesaid displacement magnifier.

It is a further object of the invention to prevent temperature variation of the magnification factor of the aforesaid displacement magnifier.

It is yet a further object of the invention to efficiently absorb vibration using the aforesaid displacement magnifier.

In order to achieve the above objects, this invention provides a displacement magnifying device for magnifying the displacement of a piezoelectric element according to an applied voltage and transmitting it to a displacement transmitting member.

The device comprises a supporting member for supporting one end of the piezoelectric element, a first elastic sealing member which moves together with the other end of the piezoelectric element, a second elastic sealing member connected to the displacement transmitting member, and a sealed chamber sealed by the first and second elastic sealing members and containing a non-compressible fluid.

This chamber has dimensions such that the volume change of the chamber per unit displacement of the first elastic sealing member is larger than the volume change of the chamber per unit displacement of the second elastic sealing member.

It is preferable that the first elastic sealing member is a diaphragm, and the second elastic sealing member is a bellows.

It is also preferable that the device further comprises a member which prevents the supporting member from approaching the displacement transmitting member closer than a predetermined distance.

This invention also provides a displacement magnifying device which comprises a supporting member for supporting one end of the piezoelectric element, a first elastic sealing member which moves together with the other end of the piezoelectric element, a second elastic sealing member connected to the displacement transmitting member, a wall member facing to the first elastic sealing member, a chamber sealed by the first and second elastic sealing members and the wall member and containing a non-compressible fluid, and a temperature compensator which varies the distance between the wall member and the supporting member depending on the temperature.

The chamber has dimensions such that the volume change of the chamber per unit displacement of the first elastic sealing member is larger than the volume change of the chamber per unit displacement of the second elastic sealing member.

It is preferable that the temperature compensator comprises a laminate of shape-memorizing alloy having a thermal expansion coefficient which compensates for the thermal expansion of the chamber and for the thermal contraction of the piezoelectric element.

This invention also provides a displacement magnifying device which comprises a supporting member for supporting one end of the piezoelectric element, a first elastic sealing member which moves together with the other end of the piezoelectric element, a second elastic sealing member connected to the displacement transmitting member, a sealed chamber sealed by the first and second elastic sealing members and containing a non-compressible fluid, and an elastic member supporting the displacement transmitting member on the supporting member outside the chamber.

The chamber has dimensions such that the volume change of the chamber per unit displacement of the first elastic sealing member is larger than the volume change of the chamber per unit displacement of the second elastic sealing member.

The details as well as other features and advantages of this invention are set forth in the remainder of the specification and are shown in the accompanying drawings.

DESCRIPTION OF THE PREFERRED EMBODIMENTS

Figure 1:
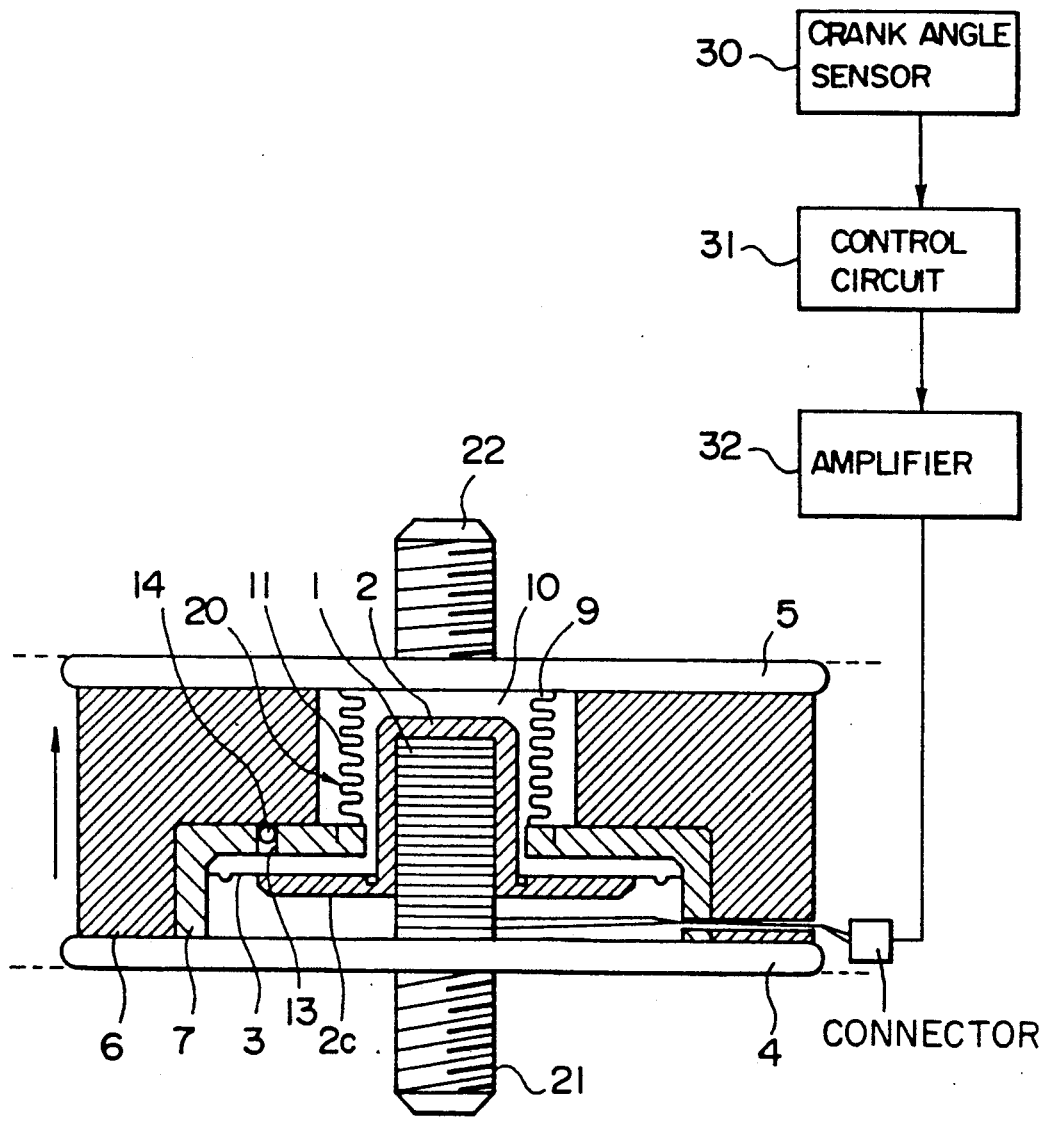
FIG. 1 is a schematic diagram of an engine vibration absorber according to an embodiment of this invention.

FIG. 1 shows an engine vibration absorber according to a first embodiment of this invention. This absorber is provided with a piezoelectric element 1 and a displacement magnifier 20. The absorber is connected to an automobile chassis by a base 4 and a fixing bolt 21, and a disc 5 is connected to the engine by a fixing bolt 22. The base 4 and disc 5 respectively act as supporting member and displacement transmitting member.

The piezoelectric element 1 is fixed to the base 4 on the opposite side of the fixing bolt 21. The element 1 may for example be a cylindrical member comprising a thin plates of a ceramic material such as PZT (lead-zirconium-titanite) and plate electrodes arranged alternately with the electrodes lying in the direction of the axis. When a voltage is applied between the plates, a distortion is produced depending on the magnitude of the voltage in such a direction as to increase the plate thickness causing the element to elongate. For a 20 mm element, this elongation is approximately 10 $\mu$m.

A predominant proportion of the piezoelectric element 1, from the tip of the element to near its base, is accommodated in a holder 2 which is a cylindrical member provided with a flange 2c at its bottom opening. The displacement magnifier 20 comprises this holder 2 and a diaphragm 3 which is a first elastic sealing member, a metal bellows 11 which is a second elastic sealing member, and a case 7. These components form a sealed chamber 9 containing a fluid medium 10. It is preferable that this fluid medium 10 is an oil with a small thermal expansion coefficient such as silicone oil or glycerine oil.

The case 7 is a shallow cylindrical member of large diameter, and the base of the bellows 11 is welded to an opening at the top of the case 7. The holder 2 projects inside the bellows 11 through this opening.

The bellows 11 has a flat upper piece which supports the disc 5 on the underside of the fixing bolt 22.

The diaphragm 3 is circular, and is formed from a pliant material such as green copper plate. Its outer edge is welded to the inner circumference of the case 7, and its inner circumference is welded to the flange 2c of the holder 2. The diameter of the diaphragm 3 is set to be larger than the diameter of the bellows 11 by a predetermined amount. The displacement of the bellows 11 is therefore magnified in comparison to the displacement of the diaphragm 3 by the ratio described hereinafter.

The fluid medium 10 is introduced into the chamber 9 from a filling port 13 provided in the case 7, and the chamber 9 is then sealed by pressing a ball 14 into the port 13.

The space between the diaphragm 3 and base 4 is open to the atmosphere.

A rubber vibration absorber 6 is provided outside the case 7 and bellows 11. This absorber 6, which is gripped between the base 4 and the disc 5, provides support for the base 4 and disc 5 in parallel with the displacement magnifier 20.

The wiring for supplying the piezoelectric element 1 is led from outside through the case 7 and the rubber vibration absorber 6. The current supplied to the element 1 is controlled by a control unit comprising a crank angle sensor 30, piezoelectric element control circuit 31 and high speed power amplifier 32.

The crank angle sensor 30 detects the engine crank angle, and inputs a crank angle signal to the control circuit 31 based on the detected value. The control circuit 31 outputs a synchronized voltage control signal based on the crank angle signal. The high speed power amplifier 32 amplifies the voltage control signal and applies the amplified voltage to the piezoelectric element 1.

When a voltage is applied to the piezoelectric element 1 from the high speed power amplifier 32, the element 1 elongates depending on the magnitude of the voltage, and the holder 2 moves in the direction shown by the arrow in FIG. 1 while distorting the diaphragm 3.

As a result, the volume of the space enclosed by the diaphragm 3 and the case 7 decreases, and an amount of the fluid medium 10 corresponding to this decrease is pushed into the bellows 11 from the gap between the holder 2 and the case 7. The fluid medium 10 which has flowed into the bellows 11 pushes up the disc 5 as the bellows 11 elongates, and the gap between the base 4 and the disc 5 is enlarged.

The average diameter of the bellows 11 (average of the outer diameter and inner diameter) is less than the diameter of the diaphragm 3 (inner diameter of the case 7). The displacement of the holder 2 is therefore enlarged by the surface area ratio of circles having these diameters, and is transmitted to the base 4.

If for example the diameter of the diaphragm 3 is 30 mm and the average diameter of the bellows 11 is 9.5 mm, the surface area ratio is approximately 10:1. The base 4 is therefore displaced by approximately 100 $\mu$m when the holder 2 is displaced by 10 $\mu$m.

In the case of engine vibration which causes engine noise and acceleration noise, the maximum displacement which occurs due to this vibration is approximately 100 $\mu$m. To suppress this vibration, therefore, the engine mounting should be given a displacement of approximately 100 $\mu$m of opposite phase, and the magnification factor of the displacement magnifier 20 should thus be of the order of 10.

Figure 2A:
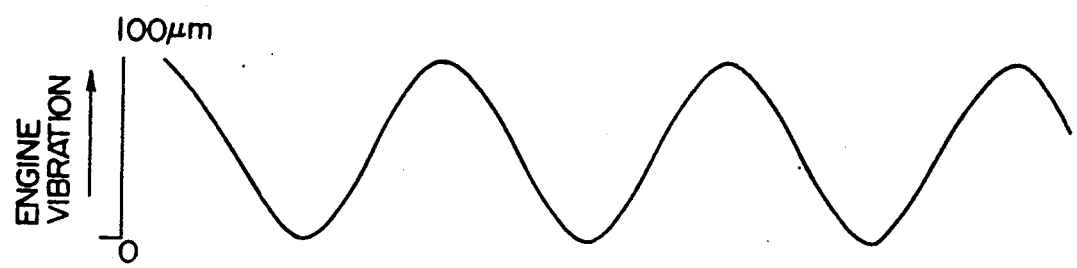
FIGS. 2A and 2B are graphs showing the relation between engine vibration and the amount of displacement of the vibration absorber.
Figure 2B:
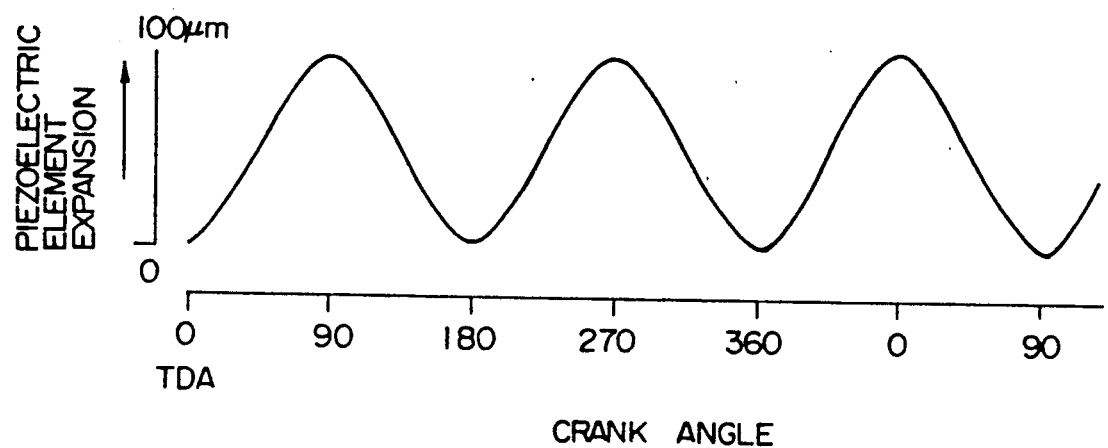

FIGS. 2A and 2B are graphs comparatively showing engine vibration amplitude and the elongation amount of the piezoelectric element based on their relation to crank angle. The vibration curve is the output obtained by passing relatively high frequency vibrations which cause engine noise and acceleration noise through a high pass filter. In a four cylinder, four cycle engine, most of the vibrations are second order. By causing the piezoelectric element 1 of the mounting device to elongate depending on the crank angle detected by the crank angle sensor 30, a vibration having opposite phase to the second order vibration of the engine is generated so that the engine vibration is suppressed. Further, as the vibration amplitude varies with engine speed, the piezoelectric element control circuit 31 varies the voltage control signal depending on engine speed so that an improved damping effect is obtained.

Vibrations of relatively low frequency such as those occurring when the engine is ticking over, or jolts for example, are absorbed by the rubber vibration absorber 6.

The static load of the engine is shared by the rubber vibration absorber 6 and the piezoelectric element 1, and the static load supported by the element 1 is set so as to obtain optimum voltage-displacement characteristics. This load sharing moreover prevents fatigue of the bellows 11 due to the high pressure inside the chamber 9, and lengthens the life of the device.

The tensile stress and shear stress produced between the base 4 and the disc 5 do not act directly on the element 1, the fluid medium 10 and the bellows 11 acting as cushions so as to prevent damage to the element 1.

Figure 3:
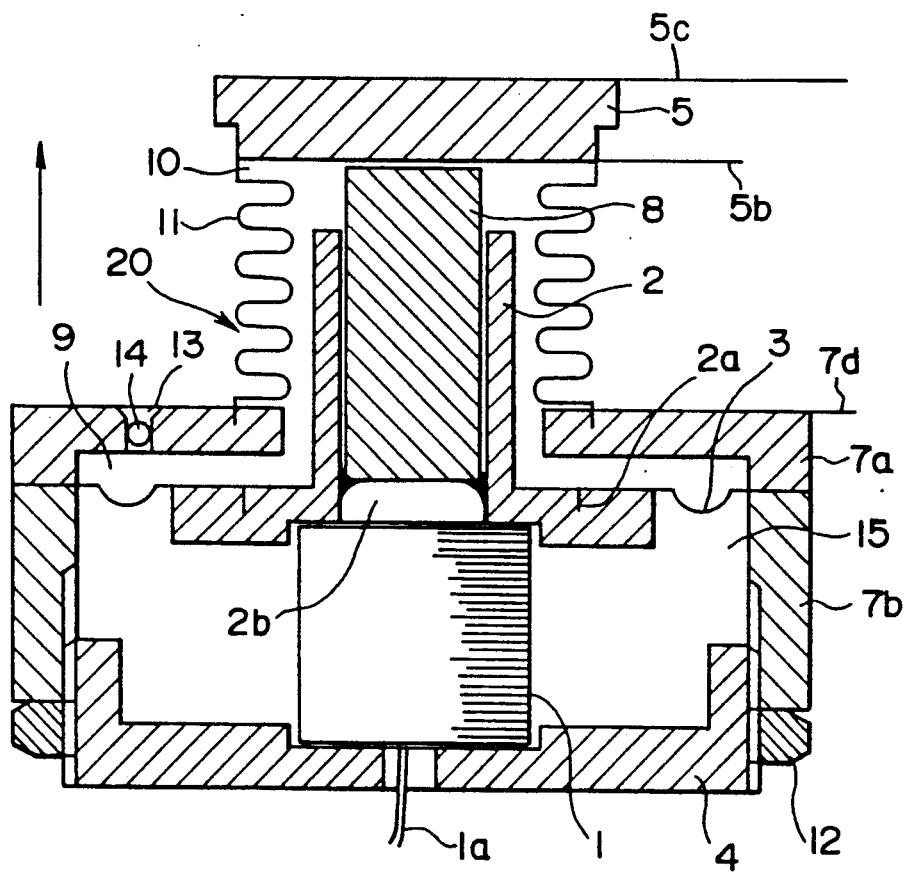
FIG. 3 is a longitudinal cross sectional view of an actuator according to a second embodiment of this invention.

FIG. 3 shows another embodiment of this invention in which the displacement magnifier is applied to a piezoelectric actuator.

In this embodiment, the case 7 is divided into an upper case 7a and lower case 7b, and the top end of the bellows 11 is welded to the outer circumference of the disc 5. The bottom surface of the holder 2 is in close contact with the upper surface of the piezoelectric element 1, and the lower surface of the element 1 is fixed to the base 4.

The base 4 is screwed into the lower case 7b, and its rotation is locked by a lock nut 12.

When a voltage is applied from the lead wires 1a, the piezoelectric element 1 elongates and the holder 2 moves in the direction shown by the arrow in FIG. 3.

A cylindrical hollow part 2b is formed in the holder 2, a position limiting rod 8 being fixed in this cylindrical hollow part 2b such that its tip projects above the holder 2.

A circular groove 2a is also formed in the holder 2, the inner edge of the diaphragm 3 being fixed to this circular groove 2a. The outer edge of the diaphragm 3 is gripped between the upper case 7a and lower case 7b.

The chamber 9 extending inside the bellows 11 is formed above the diaphragm 3, and an atmospheric chamber 15 is formed below the diaphragm, inside the case 7.

The length by which the position limiting rod 8 projects from the holder 2 is set such that it just touches the disc 5 when the diaphragm 3 and bellows 11 are in their initial positions, i.e. when no current is passed through the piezoelectric element 1 and no external forces are acting between the base 4 and disc 5.

This piezoelectric actuator is therefore assembled in the following sequence.

(1) The diaphragm 3, holder 2 and bellows 11 are attached to the lower case 7b.

(2) The overlap between the disc 5 and bellows 11 is adjusted and the two are welded together with the bellows in its initial position while the gap between the top surface 7d of the upper case 7a and the top surface 5c of the disc 5 is maintained by means of a jig.

(3) With the jig still fixed in place, the position limiting rod 8 is inserted through the underside of the cylindrical hollow part 2b. The upper end of the rod 8 is brought into contact with the under surface 5b of the disc 5 while the diaphragm 3 is held so that it cannot bend, and solder is then applied to the inside of the hollow part 2b to fix the rod 8 in place.

(4) With the jig still fixed in place, air is withdrawn from the chamber 9 by applying a reduced pressure to the filling port 13, a fluid medium 10 is introduced into the chamber 9, and the port 13 is sealed by a ball 14.

(5) With the jig still fixed in place, the piezoelectric element 1 is pushed against the holder 2, the base 4 is screwed up into the case 7, and the lock nut 12 is tightened.

By following the above steps (1)–(4), the condition that "the position limiting rod 8 should be in contact with the disc 5 when the diaphragm 3 and bellows 11 are in their initial position" is satisfied. Further, as the rod 8 and disc 5 are in contact, the pressure in the chamber 9 does not increase even if a compression is applied to the holder 2 and disc 5 in this position.

The upward displacement of the holder 2 is restricted by fixing the position limiting rod 8 inside the cylindrical hollow part 2b. In step (5), therefore, when the element 1 is brought into contact with the lower surface of the holder 2 and the base 4 is tightened in the lower case 7b with a predetermined torque, the element 1 is automatically fixed in the same position without the use of special gauges.

After the above assembly procedure is completed, the jig is removed. When the device is in use, the displacement of the disc 5 magnifies the displacement of the holder 2, and there is no interference between the position limiting rod 8 and disc 5 when a voltage is applied to the element 1. Even if an unexpectedly large compression acts on the the base 4 and disc 5, the rod 8 does not permit the displacement of the disc 5 in the direction of the compression to exceed a certain amount, and consequently the pressure of the fluid medium 10 does not rise excessively. There is therefore very little possibility that the bellows 11 will be broken due to increased pressure of the medium 10.

Further, as the pressure limiting rod 8 is soldered in the cylindrical hollow part 2b, soldering heat does not much affect the surrounding bellows 11 or on thin, flat structural components such as the diaphragm 3, and therefore the holder 2 and piezoelectric element 1 can be accurately positioned.

Figure 4:
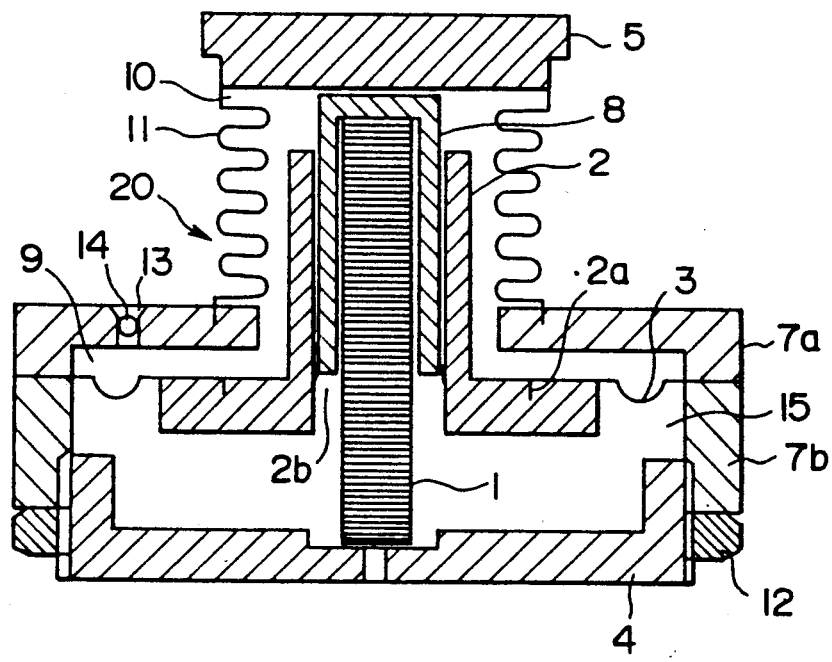
FIG. 4 is a view like FIG. 3 but showing a third embodiment of this invention.

FIG. 4 shows an actuator according to a third embodiment of this invention. In this actuator, the position limiting rod 8 is shaped like a tube and the upper part of the piezoelectric element 1 is inserted in this tube. If this construction is adopted, the outer diameter of the element 1 is smaller and less elongation force is produced. However, the element 1 can be made longer to provide sufficient displacement. As a result, for the same displacement as that of the second embodiment, the overall height of the actuator can be reduced.

Figure 5:
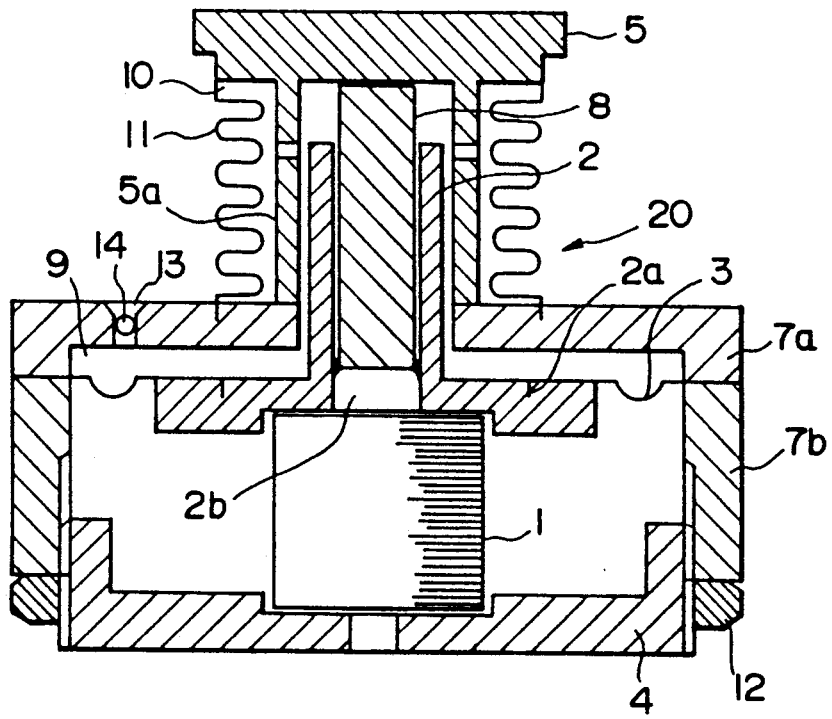
FIG. 5 is a view like FIG. 3 but showing a fourth embodiment of this invention.

FIG. 5 shows an actuator according to a fourth embodiment of this invention. In this actuator, the disc 5 has a tube-like projection 5a oriented downwards. The projection 5a is inserted in the circular gap between the holder 2 and the bellows 11, and touches the upper case 7a when the bellows 11 is in its initial position, i.e. when no current is passed through the piezoelectric element 1 and no external forces are acting between the base 4 and disc 5.

In the aforesaid second embodiment, the welding positions of the disc 5 and bellows 11 are determined using a jig, but in this actuator, the projection 5a of the disc 5 is made to touch the upper case 7a so that a jig is unnecessary. Assembly is therefore rendered easier.

Even if an excessive compression load acts on the disc 5, this projection 5a supports the disc 5 so that the excessive load is not transmitted to the element 1.

Figure 6:
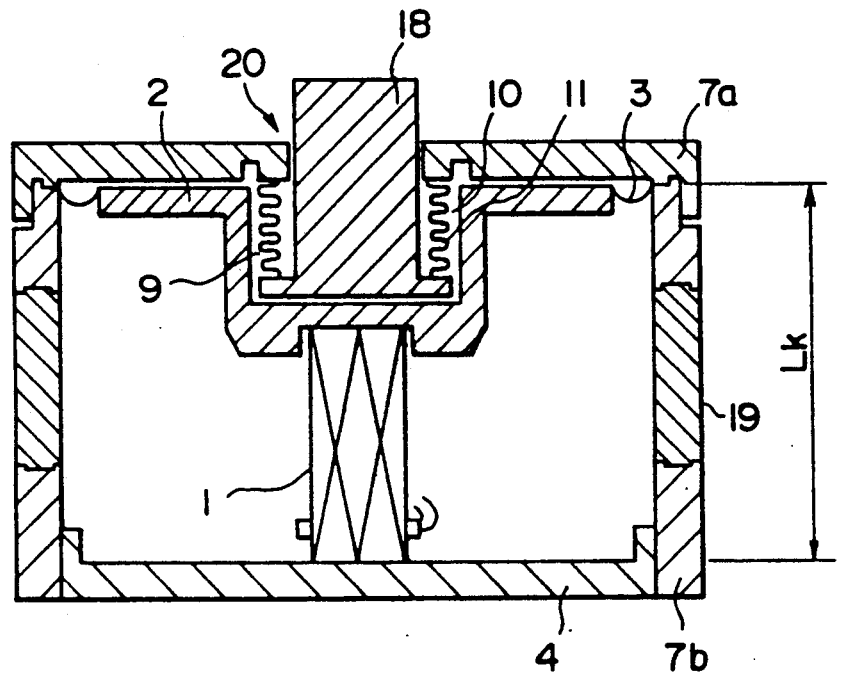
FIG. 6 is a view like FIG. 3 but showing a a fifth embodiment of this invention.

FIG. 6 shows an actuator according to a fifth embodiment of this invention. In this actuator, the displacement of the element 1 is magnified and transmitted to a plunger 18. A fluid medium 10 fills a chamber 9 formed by the plunger 18, bellows 11, case 7, diaphragm 3 and holder 2.

The element 1 is fixed between the base 4 and the holder 2. When the element 1 elongates due to an applied voltage, the holder 2 is lifted up, and the plunger 18 moves upwards to compensate the corresponding contraction of the chamber 9.

The displacement amount of the plunger 18 is a magnified elongation of the element 1 corresponding to the surface area ratio of circles of which the diameters are respectively the average diameter of the bellows 11 and the diameter of the diaphragm 3.

However, the fluid medium 10 also expands with temperature rise so as to lift the plunger 18. If this displacement magnifier 20 is applied to an opening/closing device such as a hydraulic valve or relay, there is thus a risk that the valve or relay will operate due to temperature change even if a voltage is not applied to the element 1.

In this actuator, therefore, part of the lower case 7b comprises a temperature compensator 19.

Figure 7:
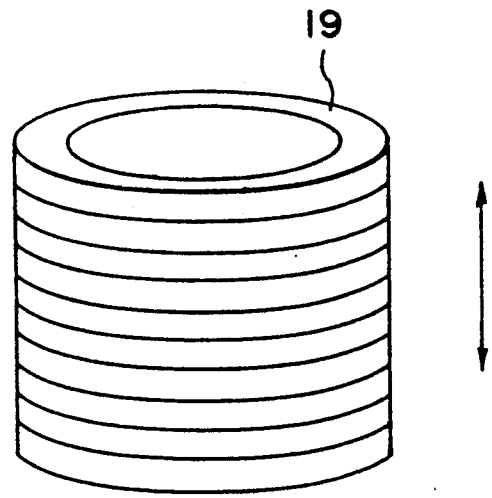
FIG. 7 is an perspective view of a temperature compensator according to a fifth embodiment of this invention.

This temperature compensator 19 may consist of a shape-memorizing metal (Ni-Ti alloy). If the Ti-Ni alloy contains Ti to the extent of 50 atom %, the temperature at which the alloy changes shape varies by approximately 10° C. when the amount of Ni changes by 0.1 atom %. As shown in FIG. 7, the temperature compensator 19 consists of a stack of Ni-Ti alloy layers wherein the shape-changing temperature of each layer is shifted by 10° C. with respect to the adjacent layer.

Figure 8:
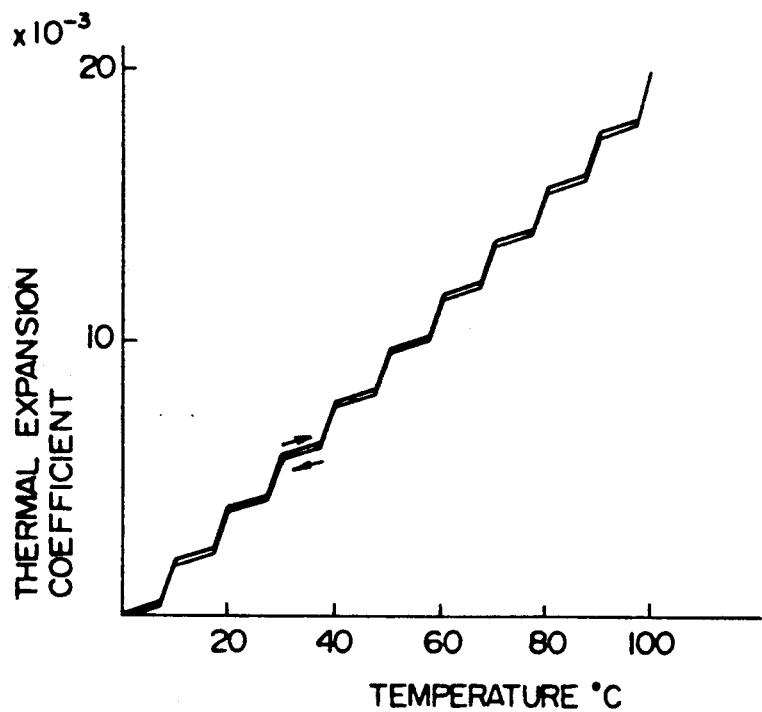
FIG. 8 is a graph showing the vibration of thermal expansion coefficient of the temperature compensator with temperature.

These alloy layers are first heated in vacuum at 500° C. for 30 minutes, and quenched in water. Each layer is then given a 3% deformation, and heated to above its shape memorizing temperature. By repeating this process 30-40 times, the alloy acquires reversible shape memorizing properties such that its height changes by approximately 0.02% with respect to a temperature change. The temperature compensator 19 formed by stacking the shape memorizing alloys thus obtained has the thermal expansion behavior shown in FIG. 8, the thermal expansion coefficient being $200 \times 10^{-6}$(/°C.) which is far greater than that of stainless steel.

A particular example will now be described where this temperature compensator 19 is used as part of the case 7.

If the fluid medium 10 is silicone oil, its initial volume $V = 1.6$ cm$^3$, the temperature rise $\Delta t = 100°$ C., and the volume expansion coefficient $\beta = 1.05 \times 10^{-3}$, the volume increase $\Delta V$ of the fluid medium 10 with respect to the temperature rise $\Delta t$ is:

$$\Delta V = \beta \times V \times \Delta t = 0.168 \text{ (cm}^3\text{)}$$

If the average diameter of the bellows 11 is 0.9 cm, its effective cross-sectional area A is 0.64 cm$^2$. The displacement Lt of the plunger 18 when the temperature rises by 100° C. is then:

$$Lt = \Delta V/A = 2600 \text{ (}\mu\text{m)}$$

The element 1 is a rectangular parallelepiped of which the length, breadth and height are $10 \times 10 \times 18$ (mm), and it consists of a laminated piezoelectric ceramic material having a linear expansion coefficient $\alpha = -6.0 \times 10^{-6}$(/°C.). If the height of the piezoelectric element 1 is L, the amount $\Delta L$ by which the height decreases if the temperature of the element rises by 100° C. is:

$$\begin{aligned}\Delta L &= \alpha \times L \times \Delta t \\ &= -6.0 \times 10^{-6} \times 18 \times 100 \\ &= 0.01 \text{ (mm)} = 10 \text{ (}\mu\text{m)}\end{aligned}$$

If the magnification factor Z of the displacement magnifier 20 is 10, the amount Lp by which the displacement of the plunger 18 decreases if the temperature of the element rises by 100° C. is:

$$\begin{aligned}Lp &= Z \times \Delta L \\ &= 10 \times 10 = 100 \text{ (}\mu\text{m)}\end{aligned}$$

The amount Lr by which the displacement of the plunger 18 increases if the temperature of the magnifier 20 rises by 100° C., is then the result of subtracting the displacement decrease due to contraction of the element 1, 100 μm, from the displacement increase due to thermal expansion of the silicone oil, 2600 μm, i.e. 2500 μm. This displacement increase of 2500 μm must be reduced to zero.

If the distance from the attachment position of the diaphragm 3 to the lower end of the element 1 is Lk as shown in FIG. 6, and Lk increases by the result of dividing the increase Lr of displacement of the plunger 18 by the displacement magnification factor Z, i.e. by $2500/10 = 250$ μm for a temperature rise of 100° C. The holder 2 moves down relative to the case 7 as it is supported by the element 1. The volume of the chamber 9 therefore increases so as to reduce the displacement of the plunger 18 by 2500 μm.

The displacement increase due to expansion of the silicone oil is therefore nullified, and the temperature variation has no effect on the displacement of the plunger 18.

In practice, however, the magnifier 20 elongates by the increase in Lk, i.e. 250 μm, and this elongation must also be compensated.

If the lower case 7b consists entirely of stainless steel, the following relation holds:

$$\gamma \times \Delta t \times Lk \times Z = Lr + \gamma \times \Delta t \times Lk$$

where $\gamma$ = linear expansion coefficient of stainless steel = $7 \times 10^{-6}$(/°C.)
Z = displacement magnification factor = 10
$\Delta t$ = temperature rise = 100(°C.)
Substituting Lr = 250 μm = 2.5 mm into the above relation, Lk is:
Lk = 397 (mm)

In other words, if the lower case 7b consists entirely of stainless steel and we take temperature compensation into account, the height of the lower case 7b is then 397 mm. This value is much larger than the height of the piezoelectric element 1 or the bellows 11, and as it would make the whole apparatus much larger, it is not practical.

If on the other hand the lower case 7b consists entirely of the temperature compensator 19, the following relation holds:

$$\delta \times \Delta t \times Lk \times Z = Lr + \delta \times \Delta t \times Lk$$

where $\delta$ = linear expansion coefficient of the shape memorizing metal = $200 \times 10^{-6}$ (°C.)

Substituting $\Delta t = 100°$ C., $Z = 10$ and $Lr = 2.5$ mm into the above relation, Lk is:

$$Lk = 13.8 \text{ (mm)}$$

In other words, if the lower case 7b consists entirely of the temperature compensator 19 and we take temperature compensation into account, the height of the lower case 7b is 13.8 mm. This value is however smaller than the piezoelectric element 1 or the bellows 11, so the device cannot be constructed with a lower case 7b of this height.

For this reason, the lower case 7b is constructed partly of stainless steel and partly of the temperature compensator 19.

If the sum of the heights of the element 1 and bellows 11 is Lq, and the linear expansion coefficient of the lower case 7b is $\epsilon$, the following relation holds:

$$\epsilon \times \Delta t \times Lq \times Z = Lr + \epsilon \times \Delta t \times Lq$$

If the height of the bellows 11 is 8 mm, $Lq = 18 + 8 = 26$ mm, and therefore:

$$\epsilon = 107 \times 10^{-6} (/°C.)$$

Next, a calculation will be performed to determine the proportions of stainless steel and temperature compensator 19 forming the lower case 7b.

If the ratio of the height of the stainless steel part to the height of the temperature compensator part 19 is x: 1−x, then:

$$\epsilon = \gamma \times x + \delta \times (1-x)$$

where $\epsilon$ = linear expansion coefficient of the lower case $7b = 107 \times 10^{-6} (/°C.)$ $\gamma$ = linear expansion coefficient of stainless steel part = $7 \times 10^{-6} (/°C.)$ $\delta$ = linear expansion coefficient of shape-memorizing metal = $200 \times 10^{-6} (/°C.)$ Thus x is:

$x = 0.48$

In other words, the stainless steel part accounts for 48% and the temperature compensation part 19 accounts for 52% of the height of the lower case 7b.

By constructing the lower case 7b of materials in the proportions calculated above, the device can be made more compact and lightweight while the temperature variation of the silicone oil is compensated.

In the aforesaid calculation, the thermal expansion of the silicone oil and the thermal contraction of the piezoelectric element 1 were compensated. If the thermal expansion of the holder 2 is also taken into consideration, an even more precise temperature compensation can be performed.

The material used for the lower case 7b is not limited to stainless steel, and may also consist of other metals such as nickel, iron or yellow copper.

Figure 9:
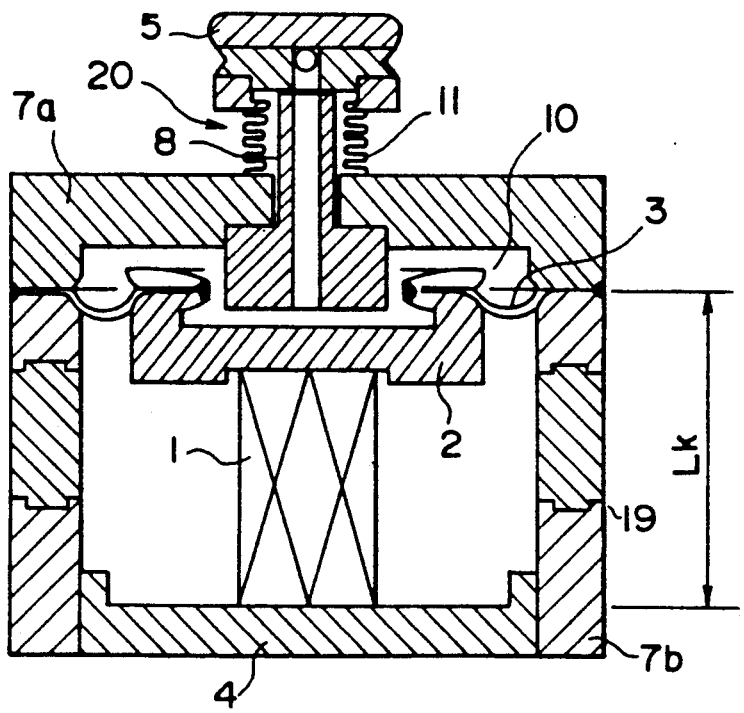
FIG. 9 is a view like FIG. 3 but showing a sixth embodiment of this invention.

FIG. 9 shows an actuator according to a sixth embodiment of this invention. In this actuator, the bellows 11 is outside the upper case 7a, and contraction of the bellows 11 in excess of a certain point is prevented by a position limiting rod 8 fixed to the upper case 7a.

By locating the bellows 11 outside the upper case 7a in this way, the height of the lower case 7b can be designed independently of the height of the bellows 11.

Figure 10:
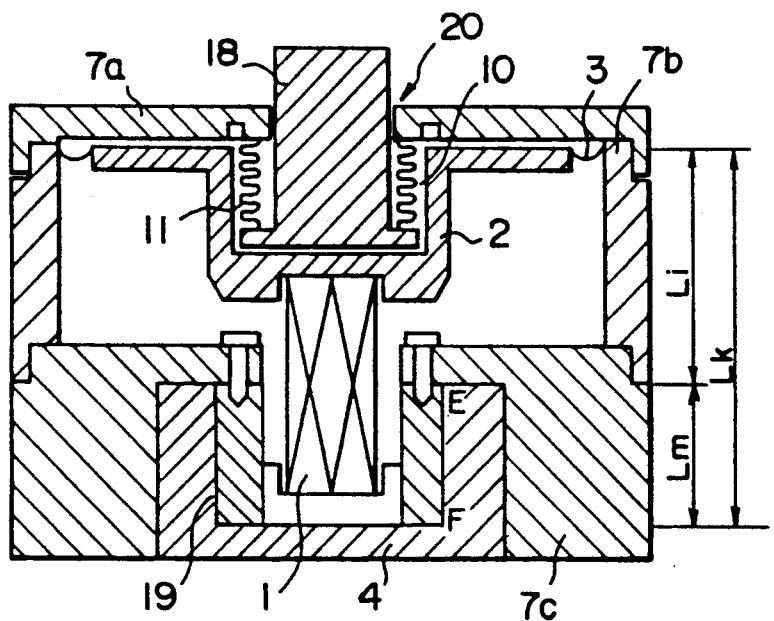
FIG. 10 is a view like FIG. 3 but showing a seventh embodiment of this invention.

FIG. 10 shows an actuator according to a seventh embodiment of this invention. In this actuator, the case 7 comprises an upper case 7a, lower case 7b and case bottom 7c. The case bottom 7c and temperature compensator 19 are connected by bolts, and the base 4 which supports the lower end of the element 1 is free to slide up and down with respect to the case bottom 7c. When the temperature compensator 19 elongates due to thermal expansion, therefore, the base 4 is pressed down, and the distance from the holder 2 increases.

The height Li of the lower case 7b also increases slightly due to thermal expansion, and this further increases the distance between the holder 2 and the base 4.

The above relations are represented by the following equation:

$$\delta \times \Delta t \times Lm \times Z + \gamma \times \Delta t \times Li \times Z = Lr + \gamma \times \Delta t \times Lk$$

Substituting $\delta = 200 \times 10^{-6} (/°C.)$
$\gamma = 7 \times 10^{-6} (/°C.)$
$Z = 10$
$\Delta t = 100$ (°C.)
$Li = 15$ (mm)
$Lk = 30$ (mm)

Lm is:

$Lm = 12$ (mm)

In other words, to perform temperature compensation with an actuator of the above dimensions, the height of the temperature compensator 19 should be 12 mm.

Figure 11:
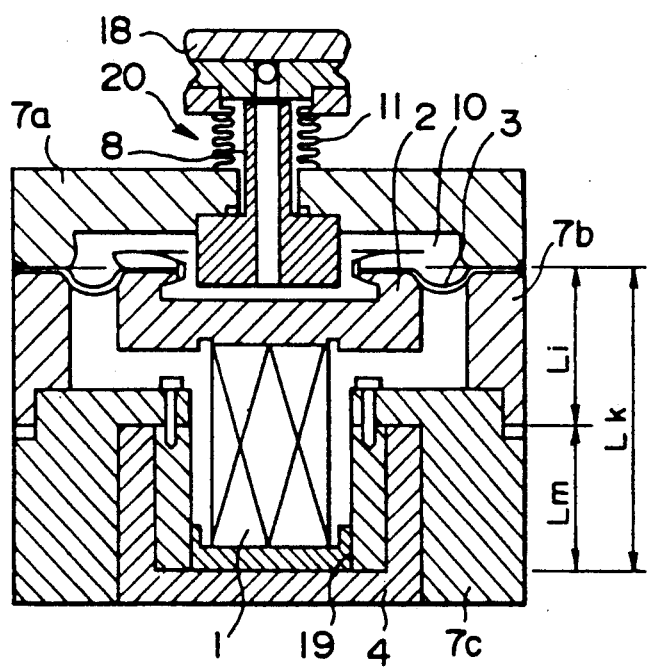
FIG. 11 is a view like FIG. 3 but showing an eighth embodiment of this invention.

FIG. 11 shows an actuator according to an eighth embodiment of this invention. In this actuator, the construction of the temperature compensator 19 is identical to that of the seventh embodiment, but the bellows 11 is located outside the upper case 7a and contraction of the bellows 11 in excess of a certain point is prevented by a position limiting rod 8 fixed to the upper case 7a as in the sixth embodiment.

By locating the bellows 11 outside the upper case 7a in this way, the height of the lower case 7b can be designed independently of the height of the bellows 11.

The foregoing description of the preferred embodiments for the purpose of illustrating this invention is not to be considered as limiting or restricting the invention, since many modifications may be made by those skilled in the art without departing from the scope of the invention.

The embodiments of this invention in which an exclusive property or privilege is claimed are defined as follows:

1. A displacement magnifying device for magnifying the displacement of a piezoelectric element according to an applied voltage and transmitting it to a displacement transmitting member, comprising:

a supporting member for supporting one end of the piezoelectric element, a first elastic sealing member which moves together with the other end of the piezoelectric element, a second elastic sealing member connected to said displacement transmitting member, and a sealed chamber sealed by said first and second elastic sealing members and containing a non-compressible fluid, said chamber including a first sub-chamber sealed by said first elastic sealing member and a second sub-chamber sealed by said second elastic sealing member, said first and second sub-chambers being communicated with each other and said first sub-chamber having a larger cross-sectional area perpendicular to the direction of said displacement than said second sub-chamber.

2. A displacement magnifying device as defined in claim 1 wherein said first elastic sealing member is a diaphragm, and said second elastic sealing member is a bellows.

3. A displacement magnifying device as defined in claim 1 further comprising a member which prevents said supporting member from approaching said displacement transmitting member closer than a predetermined distance.

4. A displacement magnifying device for magnifying the displacement of a piezoelectric element according to an applied voltage and transmitting it to a displacement transmitting member, comprising:

a supporting member for supporting one end of the piezoelectric element, a first elastic sealing member which moves together with the other end of the piezoelectric element, a second elastic sealing member connected to said displacement transmitting member, a wall member facing said first elastic sealing member, a chamber sealed by said first and second elastic sealing members and said wall member and containing a non-compressible fluid, said chamber including a first sub-chamber sealed by said first elastic sealing member and a second sub-chamber sealed by said second elastic sealing member, said first and second sub-chambers being communicated with each other and said first sub-chamber having a larger cross-sectional area perpendicular to the direction of said displacement than said second sub-chamber, and a temperature compensator which varies the distance between said wall member and said supporting member depending on the temperature.

5. A displacement magnifying device as defined in claim 4 wherein said temperature compensator comprises a laminate of shape-memorizing alloy having a thermal expansion coefficient which compensates for the thermal expansion of said fluid and for the thermal contraction of said piezoelectric element.

6. A displacement magnifying device for magnifying the displacement of a piezoelectric element according to an applied voltage and transmitting it to a displacement transmitting member, comprising:

a supporting member for supporting one end of the piezoelectric element, a first elastic sealing member which moves together with the other end of the piezoelectric element, a second elastic sealing member connected to said displacement transmitting member, a sealed chamber sealed by said first and second elastic sealing members and containing a non-compressible fluid, said chamber including a first sub-chamber sealed by said first elastic sealing member and a second sub-chamber sealed by said second elastic sealing member, said first and second sub-chambers being communicated with each other and said first sub-chamber having a larger cross-sectional area perpendicular to the direction of said displacement than said second sub-chamber, and an elastic member supporting said displacement transmitting member on said supporting member outside said chamber.

* * * * *